(No Model.)

W. J. MATERN.
HUB BOXING GAGE.

No. 328,699. Patented Oct. 20, 1885.

WITNESSES:
Donn Twitchell
C. Sedgwick

INVENTOR:
W. J. Matern
BY Munn & Co
ATTORNEYS.

UNITED STATES PATENT OFFICE.

WILLIAM J. MATERN, OF BLOOMINGTON, ILLINOIS.

HUB-BOXING GAGE.

SPECIFICATION forming part of Letters Patent No. 328,699, dated October 20, 1885.

Application filed August 4, 1885. Serial No. 173,554. (No model.)

*To all whom it may concern:*

Be it known that I, WILLIAM J. MATERN, of Bloomington, in the county of McLean and State of Illinois, have invented a new and Improved Hub-Boxing Gage, of which the following is a full, clear, and exact description.

The object of my invention is to save time and labor in accurately ascertaining the position of an axle-box in a wheel to enable the wheelwright to center the box in the wheel so that the wheel will run truly on its axle, and I accomplish this object by a very simple, inexpensive, and efficient gage device, hereinafter fully described and claimed.

Reference is to be had to the accompanying drawings, forming part of this specification, in which similar letters of reference indicate corresponding parts in all the figures.

Figure 1:
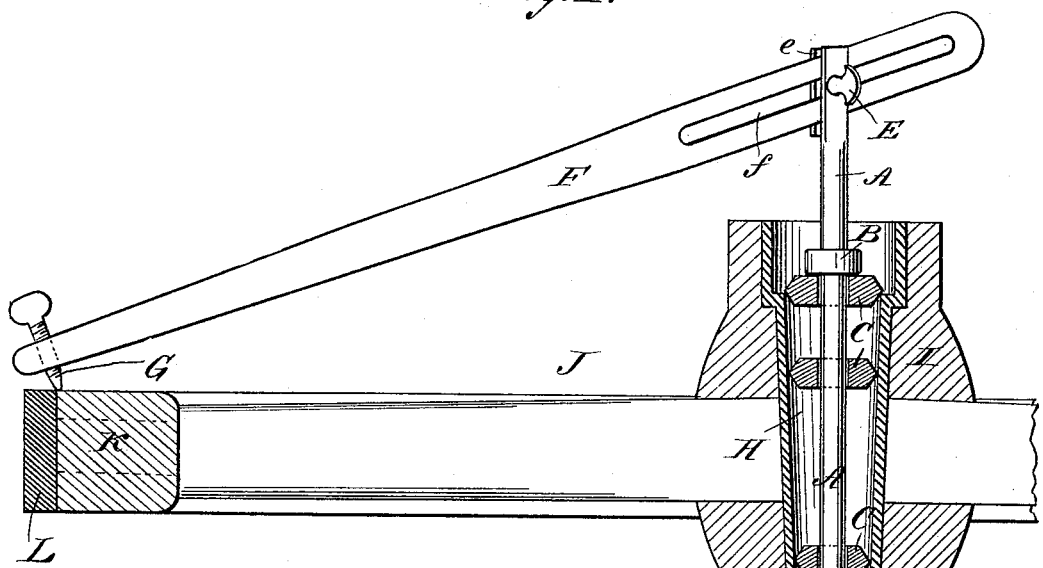

Figure 1 is a sectional elevation of my improved gage as applied to a wheel, which is shown in part and with its hub, axle-box, felly, and tire in section; and Figs. 2, 3, 4, and 5 are enlarged perspective views of different forms of the gage rings or collars.

The letter A indicates a rod, which has fixed to it, near its upper end, a collar, B, below which are placed loosely on the rod a series of rings or collars, C, which are made successively smaller in diameter toward the lower end of the rod A, which is provided with a nut or collar, as at D, to prevent the rings C from slipping off the rod.

To the top of the rod A is held, preferably by a set-screw, E, and nut or plate e, the gage-arm F, which is slotted, as at f, for the passage of the screw E, and so as to allow the indicator or marker G, which is held at the outer end of the arm, to be set nearer to or farther from the rod A of the gage, to suit wheels of varying diameters. Any suitable device may be used at the top of rod A to hold the gage-arm F to the rod.

The indicator G is shown made of an ordinary thumb-screw, threaded through the arm F and blunt at its lower end; but the indicator may have any suitable construction, and may be fitted to the gage-arm in any approved way.

Figure 4:
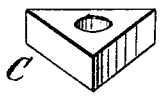
Figure 2:
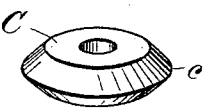
Figure 5:
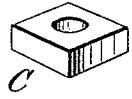
Figure 3:
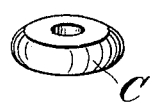
Figure 3:
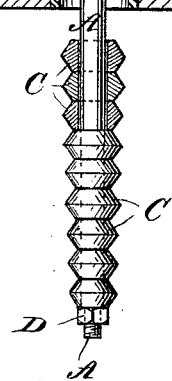

The gage rings or collars C may be made round, as in Figs. 1 and 2, with peripheries formed by beveling the opposite faces of the rings both ways to a central ridge, c, or in > shape, or the peripheries of the collars may be rounded or convexed, as shown in Fig. 3, or the collars may have triangular form, as shown in Fig. 4, or square form, as shown in Fig. 5, or may be star shaped, or, in fact, may have any form allowing two or more of them to come to a rest in the axle-box to center the rod A therein.

In operation, the rod A with the rings or collars C thereon will be passed into the axle-box H of the hub I of a wheel, J, and two or more of the collars C will bind against the tapering inner wall of the axle-box to form a true bearing for the rod A at the exact center of the axle-box, and when the gage-arm F is properly set and clamped by the screw E, or equivalent fastening, so that the indicator G will stand at about the joint of the felly K with the tire L. The rod A and arm F will together be turned around the wheel, so that the indicator G will show at the periphery of the wheel whether the axle-box stands precisely at the center of the wheel or not, the positions of the indicator being marked with chalk around the wheel, so that if the axle-box should be out of center the gage will truly indicate it so as to enable the wheelwright to adjust the box by wedging it over one way or the other in the usual way, so that the box shall stand exactly at the center of the wheel.

It will be seen that with a sufficient number of successively smaller rings or collars C on the rod A one gage may be used for almost any ordinary size of wheel, as two or more of the collars nearer to or farther from the retaining-nut D will bind in the tapering axle-box to form a true central bearing for the gage-rod.

It is obvious that the gage-arm F may be curved downward just outside of the wheel-hub, so as to lie by its lower edge flat upon the edge of the wheel-tire, and may have graduation-marks instead of an indicator, as at G, to determine the position of the axle-box in the wheel.

Having thus described my invention, I claim as new and desire to secure by Letters Patent—

1. In a hub-boxing gage, the combination, with the rod A and gage-arm F, of a series of successively smaller rings or collars placed loosely on the rod and adapted to center it in the axle-box, substantially as herein set forth.

2. A wheel-gage comprising a rod, A, having a collar, B, a series of successively smaller rings or collars, C, retained on the rod below the collar B, and a gage-arm, F, attached to the upper end of the rod A, substantially as herein set forth.

3. The combination, in a wheel-gage, of the rod A, having a collar, B, a series of successively smaller rings or collars, C, retained on the rod below the collar B, and a gage-arm, F, held adjustably to the rod A and provided with an indicator, substantially as herein set forth.

WILLIAM J. MATERN.

Witnesses:
CHARLES L. CAPEN,
LOUIS MATERN,
ALONZO BURR.